(12) United States Patent
Shinya et al.

(10) Patent No.: US 10,216,026 B2
(45) Date of Patent: Feb. 26, 2019

(54) IMAGE DISPLAY DEVICE THAT CAN DISPLAY HIGH BRIGHTNESS AND HIGH CONTRAST IMAGES AND INCLUDES A CURED RESIN LAYER

(71) Applicant: DEXERIALS CORPORATION, Tokyo (JP)

(72) Inventors: Yoshihisa Shinya, Tochigi (JP); Yusuke Kamata, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/721,748

(22) Filed: May 26, 2015

(65) Prior Publication Data
US 2015/0253598 A1 Sep. 10, 2015

Related U.S. Application Data

(63) Continuation of application No. 12/450,232, filed as application No. PCT/JP2008/057024 on Apr. 9, 2008.

(30) Foreign Application Priority Data

Apr. 9, 2007 (JP) ................................ 2007-102252
Jul. 17, 2007 (JP) ................................ 2007-186360
Jan. 11, 2008 (JP) ................................ 2008-005027

(51) Int. Cl.
*G02F 1/1333* (2006.01)
*G02F 1/1335* (2006.01)
(Continued)

(52) U.S. Cl.
CPC ........ *G02F 1/1335* (2013.01); *C08F 290/067* (2013.01); *C08L 51/003* (2013.01);
(Continued)

(58) Field of Classification Search
CPC ............ G02F 1/1335; G02F 1/133308; G02F 1/133502; G02F 2201/50; G02F 2202/023;
(Continued)

(56) References Cited

U.S. PATENT DOCUMENTS 5,073,477 A 12/1991 Kusuda et al.
5,557,436 A 9/1996 Blose et al.
(Continued)

FOREIGN PATENT DOCUMENTS

CN 1152330 A 6/1997
CN 1609943 A 4/2005
(Continued)

OTHER PUBLICATIONS

Apr. 2, 2013 Office Action issued in U.S. Appl. No. 12/450,325.
(Continued)

*Primary Examiner* — Nathanael R Briggs
(74) *Attorney, Agent, or Firm* — Oliff PLC (57) ABSTRACT

A thin image display device is provided which is free from display defects caused by the deformation of an image display part and can display high brightness and high contrast images. The image display device includes an image display part 2, a light-transmitting protective part 3 arranged on the image display part, and a cured resin layer 5 interposed between the image display part 2 and the protective part 3. The cured resin layer 5 has a light transmittance in the visible region of 90% or more and a refractive index (nD) of 1.45 or more and 1.55 or less.

20 Claims, 2 Drawing Sheets

(51) Int. Cl.
  *C08F 290/06* (2006.01)
  *C08L 51/00* (2006.01)
(52) U.S. Cl.
  CPC .. *G02F 1/133308* (2013.01); *G02F 1/133502* (2013.01); *C08L 2203/20* (2013.01); *G02F 2001/133331* (2013.01); *G02F 2201/50* (2013.01); *G02F 2202/023* (2013.01); *G02F 2202/28* (2013.01)
(58) Field of Classification Search
  CPC ............ G02F 2202/28; C08F 290/067; C08L 51/003; C08L 2203/20
  See application file for complete search history.

(56) References Cited

U.S. PATENT DOCUMENTS

| | | | |
|---|---|---|---|
| 5,976,297 A | 11/1999 | Oka et al. | |
| 6,204,896 B1* | 3/2001 | Matsuhira | G02F 1/13338 349/12 |
| 6,218,446 B1 | 4/2001 | Arnold et al. | |
| 6,383,558 B1 | 5/2002 | Fujiwara et al. | |
| 6,461,709 B1 | 10/2002 | Janssen et al. | |
| 6,654,083 B1 | 11/2003 | Toda et al. | |
| 6,673,850 B1* | 1/2004 | Yamato | C07C 323/54 522/153 |
| 7,910,033 B2 | 3/2011 | Kamata et al. | |
| 7,927,533 B2 | 4/2011 | Kamiya et al. | |
| 8,773,624 B2 | 7/2014 | Shinya et al. | |
| 2001/0039326 A1 | 11/2001 | Misumi et al. | |
| 2002/0018163 A1* | 2/2002 | Yamamoto | G02F 1/133308 349/122 |
| 2002/0118323 A1 | 8/2002 | Itou et al. | |
| 2002/0131141 A1 | 9/2002 | Saitoh | |
| 2002/0191287 A1* | 12/2002 | Miyazawa | G02B 5/3025 359/485.01 |
| 2003/0006704 A1 | 1/2003 | Morimoto et al. | |
| 2003/0087054 A1 | 5/2003 | Janssen et al. | |
| 2003/0137630 A1 | 7/2003 | Niiya | |
| 2003/0199601 A1 | 10/2003 | Chang et al. | |
| 2005/0126697 A1 | 6/2005 | Kuczynski | |
| 2005/0172891 A1 | 8/2005 | Suzuki et al. | |
| 2005/0190335 A1 | 9/2005 | Maruyama et al. | |
| 2005/0249683 A1 | 11/2005 | L'Alloret | |
| 2006/0108050 A1 | 5/2006 | Satake et al. | |
| 2006/0128856 A1 | 6/2006 | Takahashi et al. | |
| 2006/0159867 A1 | 7/2006 | O'Donnell | |
| 2006/0222809 A1 | 10/2006 | Yamada et al. | |
| 2006/0235101 A1 | 10/2006 | Messe | |
| 2006/0272771 A1* | 12/2006 | Suzuki | B32B 7/06 156/327 |
| 2006/0279923 A1 | 12/2006 | Kim et al. | |
| 2006/0292378 A1 | 12/2006 | Mgaya et al. | |
| 2007/0046874 A1 | 3/2007 | Adachi et al. | |
| 2007/0065091 A1 | 3/2007 | Hinata et al. | |
| 2007/0133225 A1 | 6/2007 | Sakai | |
| 2009/0128767 A1 | 5/2009 | Suezaki et al. | |
| 2009/0162645 A1 | 6/2009 | Matsuhira | |
| 2009/0283211 A1 | 11/2009 | Matsuhira | |
| 2009/0296033 A1 | 12/2009 | Shinya et al. | |
| 2010/0097552 A1 | 4/2010 | Shinya et al. | |
| 2010/0097746 A1 | 4/2010 | Toyoda et al. | |
| 2010/0294344 A1* | 11/2010 | Huang | B29C 43/18 136/251 |
| 2011/0069384 A1* | 3/2011 | Kodama | G02B 5/0242 359/457 |

FOREIGN PATENT DOCUMENTS

| | | |
|---|---|---|
| CN | 1661447 A | 8/2005 |
| CN | 1788041 A | 6/2006 |
| CN | 1918515 A | 2/2007 |
| CN | 1936663 A | 3/2007 |
| CN | 101681571 B | 3/2013 |
| EP | 0 789 295 A1 | 8/1997 |
| EP | 1 261 011 A2 | 11/2002 |
| EP | 1 283 106 A1 | 2/2003 |
| EP | 1 739 473 A2 | 1/2007 |
| EP | 1 973 089 A1 | 9/2008 |
| EP | 2 051 227 A1 | 4/2009 |
| EP | 2 133 855 A1 | 12/2009 |
| JP | H60-079388 A | 5/1985 |
| JP | H02-165188 A | 6/1990 |
| JP | H03-204616 A | 9/1991 |
| JP | 06-088963 A | 3/1994 |
| JP | H06-75701 A | 3/1994 |
| JP | H06-299126 A | 10/1994 |
| JP | H06-337411 A | 12/1994 |
| JP | H07-64282 A | 3/1995 |
| JP | H07-114010 A | 5/1995 |
| JP | H08-122759 A | 5/1996 |
| JP | H08-160407 A | 6/1996 |
| JP | H08-211353 A | 8/1996 |
| JP | H08-220554 A | 8/1996 |
| JP | H08-328023 A | 12/1996 |
| JP | H09-087593 A | 3/1997 |
| JP | H09-259770 A | 10/1997 |
| JP | H-09-274536 A | 10/1997 |
| JP | H09-318932 A | 12/1997 |
| JP | H10-081956 A | 3/1998 |
| JP | H10-83247 A | 3/1998 |
| JP | H10-95967 A | 4/1998 |
| JP | H10-293314 A | 11/1998 |
| JP | 2000-073025 A | 3/2000 |
| JP | 2000-111908 A | 4/2000 |
| JP | 2000-219868 A | 8/2000 |
| JP | 2000-269475 A | 9/2000 |
| JP | 2000-284700 A | 10/2000 |
| JP | 2001-026758 A | 1/2001 |
| JP | 2001026759 A | 1/2001 |
| JP | 2001-037868 A | 2/2001 |
| JP | 2001-141907 A | 5/2001 |
| JP | 2001-290005 A | 10/2001 |
| JP | 3220403 B2 | 10/2001 |
| JP | 2002-019013 A | 1/2002 |
| JP | 2002-040208 A | 2/2002 |
| JP | 2002-052552 A | 2/2002 |
| JP | 2002-092957 A | 3/2002 |
| JP | 2002-108238 A | 4/2002 |
| JP | 2002-258268 A | 9/2002 |
| JP | 2002-528298 A | 9/2002 |
| JP | 3327423 B2 | 9/2002 |
| JP | 2002-309199 A | 10/2002 |
| JP | 2002-323861 A | 11/2002 |
| JP | 2002-341317 A | 11/2002 |
| JP | 2002-341776 A | 11/2002 |
| JP | 2002-348150 A | 12/2002 |
| JP | 2002-543545 A | 12/2002 |
| JP | 2003-003150 A | 1/2003 |
| JP | 2003-029644 A | 1/2003 |
| JP | 2003-096425 A | 4/2003 |
| JP | 2003-150065 A | 5/2003 |
| JP | 2003-207790 A | 7/2003 |
| JP | 2003-295780 A | 10/2003 |
| JP | 2004-009665 A | 1/2004 |
| JP | 2004-029711 A | 1/2004 |
| JP | 2004-061925 A | 2/2004 |
| JP | 2004-069925 | 3/2004 |
| JP | 2004-077887 A | 3/2004 |
| JP | 2004-115757 A | 4/2004 |
| JP | 2004-117545 A | 4/2004 |
| JP | 2004-169023 A | 6/2004 |
| JP | 2004-170907 A | 6/2004 |
| JP | 2004-212521 A | 7/2004 |
| JP | 2004-224855 A | 8/2004 |
| JP | 2004-256595 A | 9/2004 |
| JP | 2004-271935 A | 9/2004 |
| JP | 2004-272059 A | 9/2004 |
| JP | 2004-279946 A | 10/2004 |
| JP | 2004-325788 | 11/2004 |
| JP | 2004-359769 A | 12/2004 |
| JP | 2005-023315 A | 1/2005 |
| JP | 2005-055641 A | 3/2005 |

(56) References Cited

FOREIGN PATENT DOCUMENTS

| | | | |
|---|---|---|---|
| JP | 2005-076017 A | 3/2005 |
| JP | 2005-154581 A | 6/2005 |
| JP | 2005-179481 A | 7/2005 |
| JP | 2005-225127 A | 8/2005 |
| JP | 2005-234129 A | 9/2005 |
| JP | 2005-283749 A | 10/2005 |
| JP | 2005-314687 A | 11/2005 |
| JP | 2005-315901 A | 11/2005 |
| JP | 2006-011212 A | 1/2006 |
| JP | 2006-053425 A | 2/2006 |
| JP | 2006-053531 A | 2/2006 |
| JP | 2006-058753 A | 3/2006 |
| JP | 2006-106503 A | 4/2006 |
| JP | 2006-113435 A | 4/2006 |
| JP | 2006-129678 A | 5/2006 |
| JP | 2006-150755 A | 6/2006 |
| JP | 2006-154758 A | 6/2006 |
| JP | 2006-159412 A | 6/2006 |
| JP | 2006-189715 A | 7/2006 |
| JP | 2006-193730 A | 7/2006 |
| JP | 2006-267502 A | 10/2006 |
| JP | 2006-276105 A | 10/2006 |
| JP | 2006-277828 A | 10/2006 |
| JP | 2006-282911 A | 10/2006 |
| JP | 2006-292993 A | 10/2006 |
| JP | 2006-298964 A | 11/2006 |
| JP | 2006-308866 A | 11/2006 |
| JP | 2006-342222 A | 12/2006 |
| JP | 2007-009115 A | 1/2007 |
| JP | 2007-010769 A | 1/2007 |
| JP | 2007-023147 A | 2/2007 |
| JP | 2007-041534 A | 2/2007 |
| JP | 2007-047621 A | 2/2007 |
| JP | 2007-077321 A | 3/2007 |
| JP | 2007-086290 A | 4/2007 |
| JP | 2007-102251 A | 4/2007 |
| JP | 2007-108592 A | 4/2007 |
| JP | 2007-114737 A | 5/2007 |
| JP | 2007-140220 A | 6/2007 |
| JP | 2007-156066 A | 6/2007 |
| JP | 2007-249038 A | 9/2007 |
| JP | 2007-298667 A | 11/2007 |
| JP | 2007293324 A | 11/2007 |
| JP | 2008019402 A | 1/2008 |
| JP | 2008-507617 A | 3/2008 |
| JP | 2008-129159 A | 6/2008 |
| JP | 2009-274536 A | 11/2009 |
| JP | 2015-163991 A | 9/2015 |
| JP | 2015-187742 A | 10/2015 |
| KR | 2002-0030852 A | 4/2002 |
| KR | 2005-0067162 A | 6/2005 |
| KR | 2007-0033920 A | 3/2007 |
| TW | 482913 B | 4/2002 |
| TW | 2004-22708 A | 11/2004 |
| TW | 2007-04704 A | 2/2007 |
| TW | 2007-10155 A | 3/2007 |
| TW | 200903084 A | 1/2009 |
| WO | 01/87595 A1 | 11/2001 |
| WO | 2006011461 | 2/2006 |
| WO | 2006/129665 A1 | 12/2006 |
| WO | 2007/063751 A1 | 6/2007 |
| WO | 2007/066590 A1 | 6/2007 |
| WO | 2008/007800 A1 | 1/2008 |

OTHER PUBLICATIONS

Apr. 9, 2013 Office Action issued in U.S. Appl. No. 12/450,263.
Feb. 20, 2013 Office Action issued in Japanese Patent Application No. 2008-098342.
May 9, 2013 Office Action issued in Chinese Patent Application No. 200880019222.0.
Jan. 21, 2010 International Preliminary Report on Patentability issued in PCT/JP2008/057024.
Jan. 12, 2010 International Preliminary Report on Patentability issued in PCT/JP2008/056996.
Jun. 25, 2010 Extended Search Report issued in European Patent Application No. 08740099.0.
Sep. 16, 2010 Office Action issued in U.S. Appl. No. 12/450,192.
Jun. 10, 2008 International Search Report issued in PCT/JP2008/056818.
Mar. 19, 2010 Extended Search Report issued in European Patent Application No. 08739924.2.
Jun. 10, 2008 International Search Report issued in PCT/JP2008/056601.
Jun. 7, 2010 Extended Search Report issued in European Patent Application No. 08740171.7.
Mar. 17, 2010 Extended Search Report issued in European Patent Application No. 08739711.3.
Jan. 30, 2012 Office Action issued in Chinese Patent Application No. 200880015927.5.
Apr. 12, 2012 Office Action issued in Chinese Patent Application No. 200880019222.0.
May 25, 2012 Office Action issued in U.S. Appl. No. 12/450,325.
Jul. 11, 2012 Office Action issued in European Patent Application No. 08 740 099.0.
Jul. 1, 2008 International Search Report issued in PCT/JP2008/056996.
Apr. 26, 2011 Extended Search Report issued in European Patent Application No. 11 000219.3.
Mar. 23, 2011 Office Action issued in Chinese Patent Application No. 200880019222.0.
Jul. 9, 2012 Office Action issued in European Patent Application No. 08 740 171.7.
Jul. 9, 2012 Office Action issued in European Patent Application No. 11 000 219.3.
Aug. 16, 2012 Office Action issued in Taiwanese Patent Application No. 97112940.
Sep. 6, 2012 Office Action issued in U.S. Appl. No. 12/450,263.
Oct. 9, 2012 Office Action issued in U.S. Appl. No. 12/450,108.
Oct. 22, 2012 Office Action issued in Chinese Patent Application No. 200880019222.0.
Aug. 16, 2012 Office Action issued in Taiwanese Patent Application No. 97112942.
Oct. 24, 2012 Submission of Publications and the like issued in Japanese Patent Application No. 2008-105198.
Oct. 25, 2012 Notification of Reasons for Refusal for Japanese Patent Application No. 10-240922.
Dec. 10, 2012 Submission of Publications and the Like issued in Japanese Patent Application No. 2008-098342.
Dec. 26, 2012 Notification of Reasons of Refusal issued in Japanese Patent Application No. 2012-105372.
Dec. 26, 2012 Notification of Reasons of Refusal issued in Japanese Patent Application No. 2008-105198.
Aug. 16, 2012 Office Action issued in Taiwanese Patent Application No. 097112939.
Jun. 18, 2012 Office Action issued in Chinese Patent Application No. 200880011250.8.
Aug. 15, 2012 Office Action issued in Japanese Patent Application No. 2008-185415.
Jul. 31, 2012 Office Action issued in European Patent Application No. 08 740 108.9.
Dec. 6, 2012 Office Action issued in Chinese Patent Application No. 201110129612.7.
Dec. 21, 2012 Office Action issued in Chinese Patent Application No. 200880011341.1.
Oct. 23, 2012 "Trial Decision" of Japanese Patent Application No. H11-038529 (Dissatisfaction No. 2009-14917).
Oct. 22, 2012 Submission of Publications and the like issued in Japanese Patent Application No. 2008-98342.
Mar. 28, 2012 Office Action issued in Japanese Patent Application No. 2008-096150.
Mar. 28, 2012 Office Action issued in Japanese Patent Application No. 2012-048220.
Mar. 7, 2012 Office Action issued in Japanese Patent Application No. 2008-105198.

(56) References Cited

OTHER PUBLICATIONS

Sep. 19, 2007 Written Opinion of the International Searching Authority issued in International Application No. PCT/JP2007/064120.
Jan. 13, 2012 Submission of Publications and the Like issued in Japanese Application No. 2008-98342.
Apr. 9, 2007 Japanese Patent Application No. 2007-102251.
Jul. 14, 2006 Japanese Patent Application No. 2006-193730.
Jan. 11, 2008 Japanese Patent Application No. 2008-005027.
Jul. 17, 2007 Japanese Patent Application No. 2007-186360.
Apr. 9, 2007 Japanese Patent Application No. 2007-102252.
Jun. 4, 2015 Korean Office Action in Korean Patent Application No. 2015-7008267.
May 21, 2015 Office Action issued in Taiwanese Patent Application No. 103112478.
Jul. 20, 2015 Office Action issued in European Patent Applicaiton No. 08 740 108.9.
Jul. 13, 2015 Office Action issued in Taiwanese Patent Application No. 102112670.
Jun. 3, 2015 Office Action issued in Chinese Patent Application No. 2013-10578940.4.
Feb. 15, 2015 Office Action issued in Chinese Patent Application No. 201310056745.5.
Aug. 5, 2015 Office Action issued in Chinese Patent Application No. 201310103458.5.
Aug. 24, 2015 Office Action issued in Korean Patent Application No. 2009-7021192.
Oct. 12, 2015 Office Action issued in European Patent Application No. 08 740 099.0.
Oct. 12, 2015 Office Action issued in European Patent Application No. 08 740 127.9.
Sep. 1, 2015 Office Action issued in Taiwanese Patent Application No. 101130952.
Oct. 5, 2015 Office Action issued in European Patent Application No. 08778217.3.
Oct. 22, 2015 Office Action issued in Chinese Patent Application No. 201410025812.1.
Oct. 6, 2015 Office Action issued in European Patent Application No. 11009604.7.
Oct. 27, 2015 Office Action issued in Chinese Patent Application No. 201310056745.5.
Jan. 15, 2016 Office Action issued in Chinese Patent Application No. 201310328607.8.
Feb. 25, 2016 Office Action issued in U.S. Appl. No. 12/450,325.
Jan. 20, 2016 Office Action issued in Chinese Application No. 201310578940.4.
Feb. 29, 2016 Office Action issued in Korean Patent Application No. 2015-7001682.
Mar. 1, 2016 Office Action issued in Japanese Patent Application No. 2015-104305.
Mar. 1, 2016 Office Action issued in Japanese Patent Application No. 2015-104375.
Mar. 15, 2016 Office Action issued in Japanese Patent Application No. 2015-112377.
Apr. 21, 2016 Office Action issued in Chinese Patent Application No. 2013-10103458.5.
Apr. 5, 2016 Office Action issued in Japanese Patent Application No. 2015-129846.
First May 11, 2016 Submission of Publication and the like to Commissioner of the Patent Office in Japanese Patent Application No. 2015-161711.
Second May 11, 2016 Submission of Publications and the like to Commissioner of the Patent Office in Japanese Patent Application No. 2015-161711.
May 7, 2015 Notification of Reason(s) of Refusal issued in Japanese Patent Application No. 2014-132099.
Mar. 27, 2015 Office Action issued in Taiwanese Patent Application 102112670.
Apr. 2, 2015 Office Action issued in Korean Patent Application No. 2015-7001682.
Feb. 3, 2015 Office Action issued in Taiwanese Application No. 101130952.
Jan. 15, 2015 Submission of Publications issued in Japanese Patent Application No. 2013-215621.
Jan. 21, 2015 Submission of Publications issued in Japanese Patent Application No. 2013-215621.
Dec. 24, 2014 Office Action issued in Japanese Patent Application No. 2014-022038.
Dec. 2, 2014 Office Action issued in Chinese Application No. 201310103458.5.
Jan. 2, 2015 Office Action issued in U.S. Appl. No. 12/450,325.
Dec. 12, 2014 Extended European Search Report issued in European Patent Application No. 14002672.5.
Oct. 28, 2014 Office Action issued in Korean Patent Application No. 2013-7020373.
Nov. 11, 2014 Office Action issued in Japanese Patent Application No. 2014-018947.
May 9, 2014 Office Action issued in Korean Patent Application No. 2014-7003818.
Mar. 28, 2014 Decision of Refusal issued in Japanese Patent Application No. 2008-101101.
Apr. 8, 2014 'Submission of Publications and the like' issued in Japanese Patent Application No. 2013-215621.
Jul. 31, 2014 Office Action issued in Taiwanese Patent Application No. 102118596.
Sep. 1, 2014 Office Action Issued in Japanese Application No. 2013-215621.
Aug. 28, 2014 Office Action Issued in Korean Application No. 2014-7013283.
Aug. 27, 2014 Office Action Issued in Korean Application No. 2009-7021086.
Jul. 30, 2014 Office Action Issued in Chinese Application No. 201110129612.7.
Jul. 23, 2014 Office Action Issued in Japanese Application No. 2013-089503.
Sep. 30, 2014 Office Action issued in Korean Patent Application No. 2009-7020757.
Sep. 30, 2014 Notification of Reason(s) for Refusal issued in Japanese Patent Application No. 2013-089503.
Sep. 30, 2014 Notification of Reason(s) for Refusal issued in Japanese Patent Application No. 2012-181768.
Dec. 16, 2013 Office Action issued in Korean Patent Application No. 2009-7020498.
Sep. 29, 2014 Final Rejection issued in Korean Patent Application No. 2009-7020498.
Jul. 23, 2014 'Submission of Publications and the like' issued in Japanese Application No. 2012-181768.
Jun. 6, 2014 Office Action issued in U.S. Appl. No. 12/450,325.
Jul. 1, 2014 Office Action issued in Japanese Patent Application No. 2008-100891.
Feb. 14, 2014 Office Action issued in Korean Application No. 2009-7021086.
Jan. 2, 2014 Office Action issued in Korean Application No. 2013-7026158.
Feb. 8, 2014 Office Action issued in Chinese Application No. 200880011250.8.
Jul. 2, 2013 Office Action issued in Japanese Patent Application No. 2008-100891.
Jul. 16, 2013 Office Action issued in Japanese Patent Application No. 2012-105372.
Aug. 30, 2013 Submission of Publications and the like in Japanese Patent Application No. 2008-101101.
Nov. 8, 2013 Office Action issued in U.S. Appl. No. 12/450,263.
Oct. 21, 2013 Office Action issued in Chinese Application No. 201110129612.7.
Jan. 14, 2014 Office Action issued in Japanese Application No. 2012-181768.
Feb. 12, 2014 Office Action issued in Japanese Application No. 2013-089503.
Dec. 16, 2013 Office Action issued in Korean Application No. 2009-7021093.
Nov. 12, 2013 Office Action issued in Japanese Application No. 2008-101101.

(56) References Cited

OTHER PUBLICATIONS

May 7, 2013 Office Action issued in Japanese Patent Application No. 2008-100879.
May 7, 2013 Office Action issued in Japanese Patent Application No. 2008-101983.
May 15, 2013 Office Action issued in U.S. Appl. No. 12/450,108.
Mar. 21, 2013 Office Action issued in Chinese Patent Application No. 200880011250.8.
May 8, 2013 "Submission of Publications and the like" issued in Japanese Patent Application No. 2008-105198.
Jul. 29, 2013 Office Action issued in U.S. Appl. No. 12/450,325.
Apr. 10, 2013 Office Action issued in Japanese Application No. 2008-101101.
Mar. 21, 2013 Office Action issued in Chinese Application No. 2200880011250.8.
Mar. 8, 2013 Office Action issued in Taiwanese Patent Application No. 97112939.
Aug. 6, 2008 Office Action issued in Japanese Patent Application No. 11-038529.
Dec. 26, 2008 Office Action issued in Japanese Patent Application No. 11-038529.
May 18, 2009 Office Action issued in Japanese Patent Application No. 11-038529.
Oct. 16, 2009 Preliminary Report issued in Japanese Patent Application No. 11-038529.
"Kagaku Daijiten 2", The Committee of Kagaku Daijiten, eds., Jul. 15, 2006, pp. 375, Kyoritsu Shuppan Co., Ltd.
Matsumura, ed., "Daijirin", Nov. 3, 1988, pp. 449, Sanseido Publishing Co., Ltd.
The Committee of Shogakukan Daijisen, eds., "Daijisen", Dec. 1, 1995, pp. 492, Shogakukan Inc.
Dec. 13, 2011 Submission of Publications and the Like issued in Japanese Patent Application No. 2008-105198.
Dec. 30, 2011 Submission of Publications and the Like issued in Japanese Patent Application No. 2008-101101.
Screen shot of WIPO Patentscope search of WO 2008/007800 date unknown.
Dec. 30, 2011 Submission of Publications and the Like issued in Japanese Patent Application No. 2008-100891.
Mar. 22, 2010 Supplemental European Search Report issued in European Patent Application No. 08740108.9.
Aug. 6, 2011 Office Action issued in Chinese Patent Application No. 200880011250.8.
Nov. 23, 2011 Office Action issued in Chinese Patent Application No. 200880011250.8.
Sep. 11, 2009 U.S. Appl. No. 12/450,232 filed under the name of Shinya et al.
Jan. 21, 2010 Translation of International Preliminary Report on Patentability issued in International Patent Application No. PCT/JP2008/057005.
Oct. 3, 2011 Submission of Publications and the Like issued in Japanese Application No. 2008-98342.
Jan. 21, 2010 International Preliminary Report on Patentability issued in International Application No. PCT/JP2008/057024.
Feb. 20, 2012 "Submission of Publications and the like" issued in Japanese Patent Application No. 2008-100891.
Feb. 20, 2012 "Submission of Publications and the like" issued in Japanese Patent Application No. 2008-101101.
Jul. 9, 2012 Office Action issued in European Patent Application No. 08 740 127.9.
Mar. 21, 2012 Office Action issued in Japanese Patent Application No. 2008-185415.
Mar. 23, 2011 Office Action issued in Japanese Application No. 2008-105198.
"Liquefied Polyisoprene Rubber LIR;" Catalog; 2002; pp. 1-7.
May 9, 2011 Submission of Publications and the like issued in Japanese Application No. 2008-105198.
Jul. 6, 2011 Submission of Publications and the like issued in Japanese Application No. 2008-098342.
Jul. 11, 2011 Submission of Publications and the like issued in Japanese Application No. 2008-105198.
May 25, 2011 Office Action issued in Chinese Application No. 200880011341.1.
Apr. 11, 2012 Office Action issued in Chinese Patent Application No. 200880011341.1.
Feb. 24, 2012 Office Action issued in Taiwanese Patent Application No. 097112938.
Jun. 7, 2010 Supplementary European Search Report issued in European Application No. 08740127.9.
Jun. 20, 2012 Office Action issued in Japanese Patent Application No. 2008-098342.
May 19, 2015 Office Action issued in Japanese Patent Application No. 2013-215621.
Aug. 30, 2016 Office Action issued in Japanese Patent Application No. 2015-251710.
Nov. 18, 2016 Office Action issued in European Patent Application No. 08740127.9.
Jun. 28, 2016 Office Action issued in Japanese Patent Application No. 2015-161711.
Jul. 28, 2016 Office Action issued in Chinese Application No. 201410025812.1.
Dec. 21, 2016 Third Party Submission of Publication issued in Japanese Application No. 2015-161711.
Dec. 13, 2016 Office Action issued in U.S. Appl. No. 12/450,325.
Dec. 5, 2016 Search Report issued in European Patent Application No. 16001361.1.
Jul. 5, 2017 Office Action issued in U.S. Appl. No. 12/450,325.
Jan. 3, 2017 Office Action issued in Chinese Patent Application No. 201310103458.5.
Jan. 19, 2017 Office Action issued in Chinese Patent Application No. 201410025812.1.
Jun. 2, 2017 Office Action issued in European Application No. 08 740 108.9.
Jun. 7, 2017 Notification of Reasons for Refusal issued in Japanese Application No. 2016-128496.
Mar. 21, 2017 Office Action issued in Japanese Patent Application No. 2016-128495.
Mar. 21, 2017 Office Action issued in Japanese Patent Application No. 2015-161711.
May 10, 2017 Summons to Attend Oral Proceedings Issued in European Patent Application No. 08778217.3.
May 11, 2017 Summons to Attend Oral Proceedings issued in European Application No. 11009604.7.
Aug. 18, 2017 Office Action issued in Chinese Application No. 201510002749.4.
Nov. 28, 2017 Notification of Reasons for Refusal issued in Japanese Patent Application No. 2016-246431.
Aug. 22, 2017 Office Action issued in Korean Patent Application No. 10-2017-7016187.
May 29, 2018 Office Action issued in Korean Application No. 10-2017-7016187.
Mar. 20, 2018 Office Action issued in Japanese Application No. 2017-121431.
Aug. 24, 2018 Notification of Reasons for Refusal issued in Japanese Patent Application No. 2016-246431.
Jul. 20, 2018 Office Action issued in U.S. Appl. No. 12/450,325.
Jul. 27, 2018 Extended European Search Report issued in European Patent Application No. 18179069.2.
Sep. 12, 2018 Office Action issued in Korean Patent Application No. 10-2018-7018731.
Jul. 31, 2018 Office Action issued in Chinese Application No. 201610359328.1.
Nov. 16, 2018 Office Action issued in Korean Application No. 2016-7017497.

* cited by examiner

IMAGE DISPLAY DEVICE THAT CAN DISPLAY HIGH BRIGHTNESS AND HIGH CONTRAST IMAGES AND INCLUDES A CURED RESIN LAYER

CROSS REFERENCE TO RELATED APPLICATION

This application is a continuation application of U.S. application Ser. No. 12/450,232, filed Sep. 17, 2009, the contents of which are incorporated herein by reference.

TECHNICAL FIELD

The present invention relates to an image display device such as a liquid crystal display device (LCD) used, for example, in a cellular phone, and in particular to an image display device that includes a transparent protective part arranged on an image display part and a cured resin layer arranged between the image display part and the protective part.

BACKGROUND ART

Figure 4:
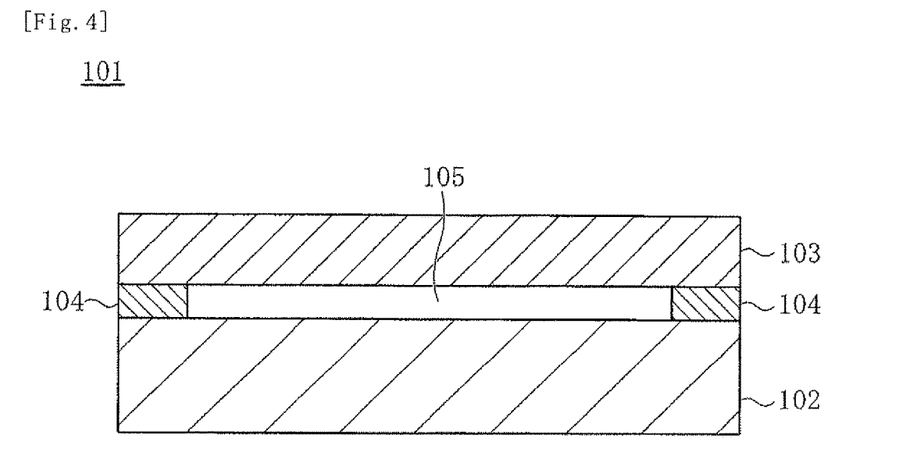
FIG. 4 is a cross-sectional view illustrating the main part of a conventional display device

One conventional example of such an image display device is a liquid crystal display device 101 shown in FIG. 4.

This liquid crystal display device 101 includes a transparent protective part 103 made of, for example, glass or plastic on a liquid crystal display panel 102, as shown in FIG. 4.

In this display device, to protect the surface of the liquid crystal display panel 102 and a polarizing plate (not shown), a spacer 104 is arranged between the liquid crystal display panel 102 and the protective part 103 to form a gap 105 between the liquid crystal display panel 102 and the protective part 103.

However, the gap 105 present between the liquid crystal display panel 102 and the protective part 103 causes light scattering, and this results in a reduction in contrast and in brightness. In addition, the presence of the gap 105 also makes it difficult to produce thinner display panels.

In view of the above problems, a technique has been proposed in which the gap between the liquid crystal display panel and the protective part is filled with a resin (for example, Patent Document 1). However, the stress during cure shrinkage of the cured resin causes deformation of optical glass plates sandwiching the liquid crystal of the liquid crystal display panel. This results in display defects such as irregularities in the orientation of the liquid crystal material.

[Patent Document 1] Japanese Patent Application Laid-Open No. 2005-55641.

DISCLOSURE OF THE INVENTION

Problems to be Solved by the Invention

The present invention has been made in view of the problems in the conventional technologies. It is an object of the present invention to provide a thin image display device which is free from display defects caused by the deformation of an image display part and can display high brightness and high contrast images.

Means for Solving the Problems

To achieve the above object, the present inventors have conducted extensive studies and found that as the difference in refractive index ($\Delta$nD) between the protective part and gap of an image display device increases, the brightness and contrast of the image display device are lowered due to the scattering and attenuation of image light from the image display part. This results in a reduction in visibility. To avoid this problem, the present inventors have found that it is effective to arrange a cured resin layer having a certain refractive index between the image display part and the protective part. Thus, the present invention has been completed.

The inventors have also found that the internal stress accumulated during curing of a resin composition can be approximated by the product of the storage modulus after curing and the curing shrinkage ratio. Therefore, it is preferable to use, as the resin composition arranged between the image display part and the protective part, a resin composition that has a certain curing shrinkage ratio and yields a cured product having a certain storage modulus.

Accordingly, the present invention provides an image display device, comprising an image display part and a light-transmitting protective part arranged on the image display part, wherein the image display device further comprises a cured resin layer arranged between the image display part and the protective part, and the cured resin layer has a light transmittance in a visible region of 90% or more and a refractive index (nD) of 1.45 or more and 1.55 or less.

Preferably, in the present invention, the cured resin layer has an elastic modulus at 25° C. of $1.0 \times 10^7$ Pa or less.

Preferably, in the present invention, the cured resin layer is a cured product of a resin composition having a curing shrinkage ratio of 5% or less.

Preferably, in the present invention, the cured resin layer has a refractive index (nD) of 1.51 or more and 1.52 or less.

In the present invention, the image display part may be a liquid crystal display panel.

In the present invention, the protective part may be formed from an acrylic resin.

In the present invention, the protective part may be formed from an optical glass.

Effects of the Invention

In the present invention, the cured resin layer arranged between the image display part and the protective part has a light transmittance of 90% or more and a refractive index (nD) of 1.45 or more and 1.55 or less and more preferably, for example, 1.51 or more and 1.52 or less. In this manner, as compared to the case in which air having a refractive index of 1.0 is arranged therebetween, the differences in refractive index at the interface of the image display part and the interface of the protective part are smaller, so that the scattering and attenuation of image light from the image display part can be reduced. Therefore, according to the present invention, the brightness and contrast of the displayed image can be increased, whereby the visibility can be improved.

In the present invention, the use of a resin composition having a curing shrinkage ratio of 5% or less and yielding a cured product having a storage modulus at 25° C. of $1.0 \times 10^7$ Pa or less can minimize the influence of the stress during cure shrinkage of the resin on the image display part and the protective part. Therefore, almost no distortion occurs in the image display part and the protective part.

Accordingly, a high brightness and high contrast image can be displayed without display defects.

In particular, when the image display part is a liquid crystal display panel, display defects such as irregularities in the orientation of the liquid crystal material can be reliably prevented, so that a high quality image can be displayed.

Moreover, in the present invention, the gap between the image display part and the protective part is filled with the cured resin. This provides high impact resistance.

In addition, an image display device thinner than the conventional example in which a gap is formed between the image display part and the protective part can be provided.

DESCRIPTION OF REFERENCE NUMERALS 1 image display device, 2 display part, 3 protective part, 4 spacer, 5 cured resin, 6 and 7 polarizing plate Best Mode for Carrying Out the Invention Hereinafter, preferred embodiments of the present invention will be described in detail with reference to the drawings. In the drawings, the same reference numerals denote the same or like elements.

Figure 1:
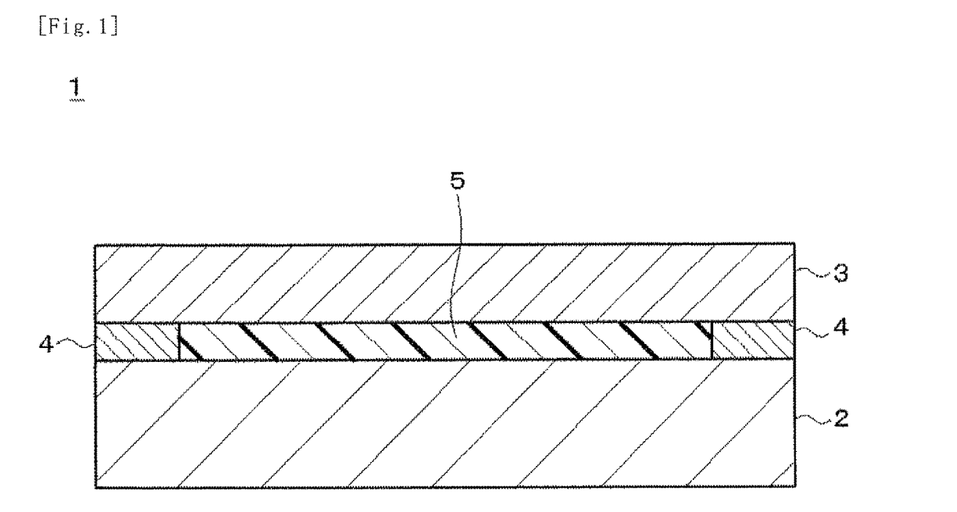
FIG. 1 is a cross-sectional view illustrating the main part of an embodiment of an image display device according to the present invention.
Figure 2:
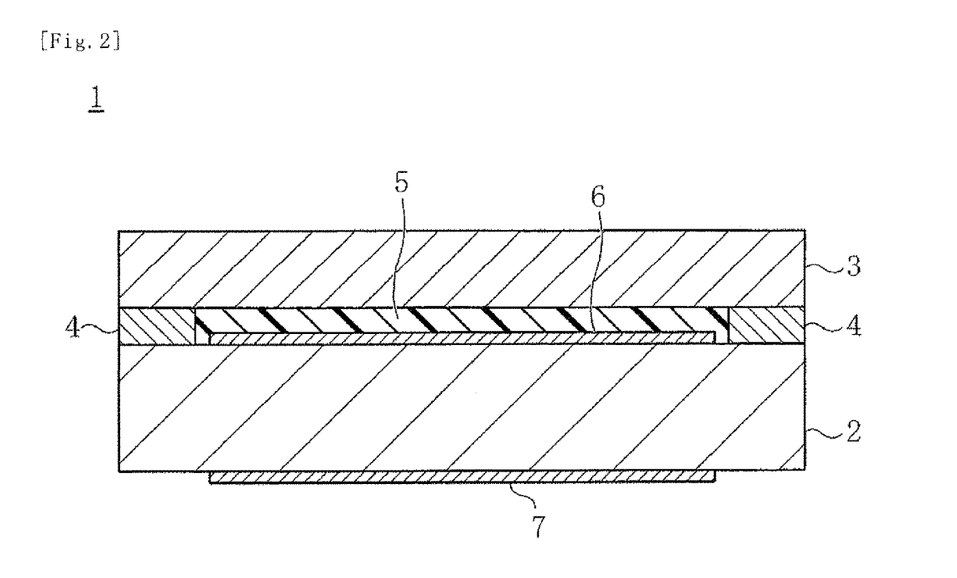
FIG. 2 is a cross-sectional view illustrating the main part of another embodiment of the image display device according to the present invention.

FIGS. 1 and 2 are cross-sectional views illustrating the main parts of embodiments of an image display device according to the present invention. The display device 1 of each embodiment includes: an image display part 2 that is connected to a driving circuit (not shown) and displays an image in a predetermined manner; and a light-transmitting protective part 3 that is arranged so as to face the image display part 2 with a predetermined distance therebetween, as shown in FIGS. 1 and 2.

No particular limitation is imposed on the image display device, and the image display device can be applied to various applications. Examples of the image display device include liquid crystal display devices for a cellular phone, a portable game device, and the like. The image display part 2 of each embodiment may be the liquid crystal display panel of such a liquid crystal display device.

When the image display part 2 is a liquid crystal display panel, polarizing plates 6 and 7 are provided on the surfaces of the liquid crystal display panel, as shown in FIG. 2.

When the body of the liquid crystal display panel is formed from an optical glass, the refractive index (nD) thereof is generally 1.49 to 1.50. Some tempered glass has a refractive index (nD) of about 1.55.

The protective part 3 is a plate-, sheet-, or film-like light-transmitting member having substantially the same size as the size of the display part 2. For example, optical glass or plastic (an acrylic resin, such as polymethyl methacrylate, or the like) can be suitably used as the light-transmitting member. An optical layer such as an anti-reflective film, a shielding film, or a viewing angle control film may be formed on the front or rear surface of the protective part 3.

When the protective part 3 is formed from an acrylic resin, the refractive index (nD) thereof is generally 1.51 to 1.52.

The protective part 3 is arranged on the display part 2 through a spacer 4 provided on a peripheral part of the display part 2. The spacer 4 has a thickness of about 0.05 to about 1.5 mm, so that the distance between the surfaces of the image display part 2 and the protective part 3 is maintained at about 1 mm.

To improve the brightness and contrast, a frame-like shielding part (not shown) is provided on the peripheral part of the protective part 3.

A cured resin layer 5 is arranged between the image display part 2 and the protective part 3. This cured resin layer 5 has a light transmittance in the visible region of 90% or more. Preferably, the cured resin layer 5 is formed so as to have a thickness of 50 to 200 μm.

Preferably, the cured resin layer 5 has a refractive index (nD) substantially the same as those of the image display part 2 and the protective part 3. More specifically, the refractive index (nD) is 1.45 or more and 1.55 or less, and preferably 1.51 or more and 1.52 or less. In this manner, the brightness and contrast of the image light from the image display part 2 can be increased, so that the visibility can be improved.

The cured resin layer 5 has a storage modulus at 25° C. of preferably $1.0 \times 10^7$ Pa or less, and more preferably $1 \times 10^3$ to $1 \times 10^6$ Pa. Typically, even when the main resin component constituting the curable resin composition is the same, if a remaining resin component or monomer component to be used is different, the cured resin formed by curing such a curable resin composition may have a storage modulus (25° C.) exceeding $1 \times 10^7$. Such a cured resin layer is not preferred.

The cured resin layer 5 is a cured product of a resin composition having a curing shrinkage ratio of preferably 5% or less, more preferably 4.5% or less, and still more preferably 4.0% or less, and most preferably 0 to 2%. In this manner, the internal stress that builds up in the cured resin layer when the curable resin composition is cured can be reduced, and the occurrence of distortion at the interface between the cured resin layer 5 and the liquid crystal display panel 2 or the protective part 3 can be prevented. Therefore, when the resin composition is arranged between the liquid crystal display panel 2 and the protective part 3 and then cured, the cured product can reduce light scattering at the interface between the cured resin layer 5 and the liquid crystal display panel 2 or the protective part 3. This can improve both the brightness of the displayed image and the visibility.

The magnitude of the internal stress that builds up in the cured product of a resin composition during curing can be evaluated by the average surface roughness of the cured resin obtained by dropping the resin composition onto a flat plate and curing the dropped resin composition. For example, 2 mg of a resin composition is dropped onto a glass or acrylic plate and cured by irradiation with UV light to a cure ratio of 90% or more. When the average surface roughness of the resultant cured resin is 6.0 nm or less, the interfacial distortion caused by the cured product of the curable resin composition arranged between the liquid crystal display panel 2 and the protective part 3 is practically negligible. With the curable resin composition used in the present invention, the average surface roughness can be preferably 6.0 nm or less, more preferably 5.0 nm or less, and still more preferably 1 to 3 nm. Therefore, the distortion at the interfaces of the cured resin is practically negligible.

Any glass plate used for sandwiching the liquid crystal of a liquid crystal cell or used as the protective plate of a liquid crystal cell may be preferably used as the above glass plate. Any acrylic plate used as the protective plate of a liquid crystal cell may be preferably used as the above acrylic plate. The average surface roughness of such glass and acrylic plates is typically 1.0 nm or less.

It is preferable from the viewpoint of improving productivity that the resin composition forming the cured resin layer 5 is a photocurable resin composition. To prepare the resin composition such that the cured resin layer 5 has a refractive index (nD) of 1.51 or more and 1.52 or less, the monomer of the resin composition is selected.

Preferred examples of such a resin include a resin composition containing: at least one kind of polymer, such as a polyurethane acrylate, a polyisoprene acrylates or an ester thereof, a hydrogenated terpene resin, and a butadiene polymer; at least one kind of acrylate monomer, such as isobornyl acrylate, dicyclopentenyloxyethyl methacrylate, and 2-hydroxybutyl methacrylate; and a photo polymerization initiator such as 1-hydroxy-cyclohexyl-phenyl-ketone.

The protective part 3 often has a UV cut function to protect the display part 2 from UV light. In such a case, it is preferable to use, as the photo polymerization initiator, a photo polymerization initiator that can initiate curing in the visible region (for example, trade name: SpeedCure TPO, product of Nihon SiberHegner K.K.).

In a method of producing the image display device 1 of each embodiment, for example, the spacer 4 and a projecting bank portion (not shown) are first provided on the peripheral part of the image display part 2, and a predetermined amount of the above-described photocurable resin composition is dropped to the inner region surrounded by the spacer 4 and the projecting bank portion.

Then, the protective part 3 is placed on the spacer 4 of the image display part 2, and the gap between the display part 2 and the protective part 3 is completely filled with the resin composition.

Subsequently, the resin composition is irradiated with UV light through the protective part 3 to thereby cure the resin composition. In this manner, the target image display device 1 is obtained.

In this image display device 1, since the refractive index of the cured resin layer 5 is substantially the same as that of the protective part 3, the brightness and contrast can be increased, so that the visibility can be improved.

Since the influence of the stress during cure shrinkage of the resin on the image display part 2 and the protective part 3 can be minimized, almost no distortion occurs in the image display part 2 and the protective part 3. Therefore, no deformation occurs in the image display part 2, so that a high brightness and high contras image can be displayed without display defects.

Moreover, since the gap between the image display part 2 and the protective part 3 is filled with the cured resin layer 5, high impact resistance is obtained.

In addition, the image display device 1 can be produced thinner than the conventional example in which a gap is provided between the image display part and the protective part.

Figure 3:
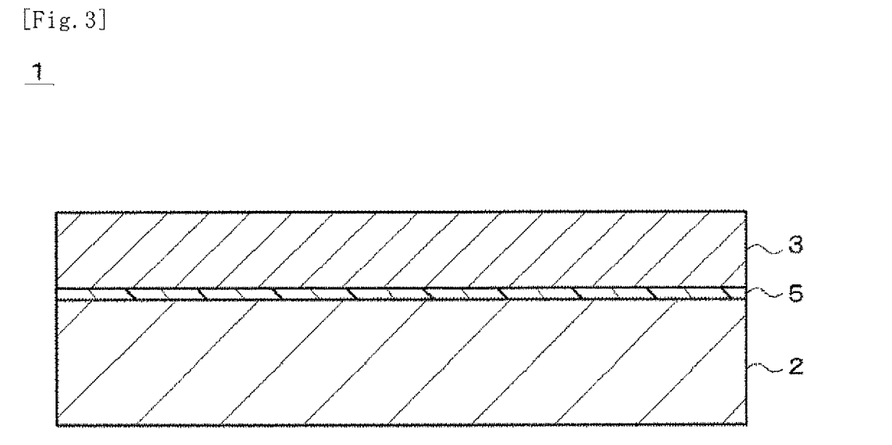
FIG. 3 is a cross-sectional view illustrating the main part of another embodiment of the image display device according to the present invention.

The present invention can be embodied in other various forms. For example, an image display device 1 having no spacers 4 may be produced as shown in FIG. 3. In this case, the above-described photocurable resin composition is applied to a base 2, and the protective part 3 is placed on the applied resin composition. The resin composition is cured with light in the same manner as described above.

Moreover, the present invention is applicable not only in the liquid crystal display device described above, but also in various panel displays such as an organic EL, a plasma display apparatus and the like.

EXAMPLES

Hereinafter, the present invention will be specifically described by way of Examples and Comparative Examples, but the invention is not limited to the following Examples.

Example 1

50 Parts by weight of polyurethane acrylate (trade name: UV-3000B, manufactured by Nippon Synthetic Chemical Industry Co., Ltd.), 30 parts by weight of isobornyl acrylate (trade name: IBXA, manufactured by Osaka Organic Chemical Industry Ltd.), 3 parts by weight of a photopolymerization initiator (trade name: IRGACURE 184, manufactured by Ciba Specialty Chemicals Inc.), and 1 part by weight of a photopolymerization initiator (trade name: SpeedCure TPO, manufactured by Nihon SiberHegner K.K.) were kneaded using a kneader to prepare a resin composition of Example 1.

Example 2

70 Parts by weight of an ester compound formed from a maleic anhydride adduct of polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 140 parts by weight of a butadiene polymer, 4 parts by weight of a photopolymerization initiator, and 0.5 parts by weight of a photo polymerization initiator for visible light were kneaded using a kneader to prepare a resin composition of Example 2.

Example 3

100 Parts by weight of an ester compound formed from a maleic anhydride adduct of polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 210 parts by weight of a butadiene polymer, 7 parts by weight of a photopolymerization initiator, and 1.5 parts by weight of a photopolymerization initiator for visible light were kneaded using a kneader to prepare a resin composition of Example 3.

Example 4

70 parts by weight of an ester compound formed from a maleic anhydride adduct of a polyisoprene polymer and 2-hydroxyethyl methacrylate (trade name: UC-203, manufactured by Kuraray Co., Ltd.), 30 parts by weight of dicyclopentenyl oxyethyl methacrylate (trade name: FA512M, manufactured by Hitachi Chemical Co., Ltd.), 10 parts by weight of 2-hydroxybutyl methacrylate (trade name: Light Ester HOB, manufactured by Kyoeisha Chemical Co., Ltd.), 30 parts by weight of a hydrogenated terpene resin (trade name: Clearon P-85, manufactured by Yasuhara Chemical Co., Ltd.), 35 parts by weight of a butadiene polymer (trade name: Polyoil 110, manufactured by Zeon Corporation), 5 parts by weight of a photopolymerization initiator (trade name Irgacure 184D, manufactured by Ciba Specialty Chemicals Inc.), and 2 parts by weight of a photopolymerization initiator (trade name SpeedCure TPO, manufactured by Nihon SiberHegner K.K.) were kneaded using a kneader to prepare a resin composition of Example 4.

Comparative Example 1

50 Parts by weight of polybutadiene acrylate (trade name: TE-2000, manufactured by Nippon Soda Co., Ltd.), 20 parts by weight of hydroxyethyl methacrylate (trade name: Light Ester HO, manufactured by Kyoeisha Chemical Co., Ltd.), 3 parts by weight of a photopolymerization initiator (Irgacure 184, manufactured by Ciba Specialty Chemicals Inc.), and 1 part by weight of a photopolymerization initiator (trade name: SpeedCure TPO, manufactured by Nihon SiberHegner K.K.) were kneaded using a kneader to prepare a resin composition of Comparative Example 1.

Comparative Example 2

50 parts by weight of polyurethane acrylate (trade name: UV-3000B, manufactured by Nippon Synthetic Chemical Industry Co., Ltd.), 30 parts by weight of tricyclodecane dimethanol acrylate (trade name: NK Ester LC2, manufactured by Shin-nakamura Chemical Co., Ltd.), 3 parts by weight of a photopolymerization initiator (Irgacure 184, manufactured by Ciba Specialty Chemicals Inc.), and 1 part by weight of a photopolymerization initiator (trade name: SpeedCure TPO, manufactured by Nihon SiberHegner K.K.) were kneaded using a kneader to prepare a resin composition of Comparative Example 2.

Comparative Example 3

50 parts by weight of polybutadiene acrylate (trade name: TE-2000, manufactured by Nippon Soda Co., Ltd.), 20 parts by weight of isobornyl acrylate (trade name: IBXA, manufactured by Osaka Organic Chemical Industry Ltd.), 3 parts by weight of a photopolymerization initiator (Irgacure 184, manufactured by Ciba Specialty Chemicals Inc.), and 1 part by weight of a photopolymerization initiator (trade name: SpeedCure TPO, manufactured by Nihon SiberHegner K.K.) were kneaded using a kneader to prepare a resin composition of Comparative Example 3.

Evaluation 1

The resin compositions prepared in Examples 1 to 4 and Comparative Examples 1 to 3 were measured for light transmittance, storage modulus, curing shrinkage ratio, surface roughness, refractive index, and brightness as follows. The results are shown in Table 1.

[Preparation of Samples]

The resin compositions prepared in Examples 1 to 4 and Comparative Examples 1 to 3 were dropped onto a 100 μm-thick white glass plate so as to have a predetermined thickness. The glass plates were conveyed onto a UV conveyer to obtain cured products of the resins having a predetermined thickness. These serve as samples for measuring light transmittance, storage modulus, and curing shrinkage ratio.

[Light Transmittance]

The light transmittance in the visible region was measured for each sample (the cured resin thickness of 100 μm) using an UV-visible spectrophotometer (V-560, manufactured by JASCO Corporation) and was found to be 90% or more for all the samples.

[Storage Modulus]

The storage modulus (Pa) (25° C.) was measured for each sample at a measurement frequency of 1 Hz using a viscoelastometer (DMS 6100, manufactured by Seiko Instruments Inc.).

[Curing Shrinkage Ratio]

The specific gravities of the uncured resin solution and the cured solid product were measured using an electronic densimeter (SD-120L, manufactured by Mirage Co., Ltd.), and the curing shrinkage ratio (%) was calculated by the following equation based on the difference in the specific gravities between the uncured resin solution and the cured solid product.

Curing shrinkage ratio (%)={(Cured product specific gravity−Resin solution specific gravity)/(Cured product specific gravity)}×100  [Equation 1]

[Surface Roughness]

2 mg of each resin composition was dropped onto a glass plate for a liquid crystal cell. Then, the distortion (Ra: average surface roughness) in a predetermined region (2.93 mm×2.20 mm) of a glass plate surface caused by the internal stress during UV curing was measured using a three-dimensional non-contact surface roughness meter manufactured by Zygo Corporation.

[Refractive Index]

Each resin composition was interposed between two releasing PET films and formed into a film shape using a spacer having a thickness of 100 μm. This was conveyed on a UV conveyer to cure the resin between the films. Subsequently, the releasing PET films were removed. The cured resin was cut into pieces of appropriate size, and the cut pieces were used as samples.

The sample of each cured resin was measured for refractive index using a refractometer (Model-3, manufactured by ATAGO Co., Ltd.).

[Brightness]

The image display device shown in FIG. 2 and including a protective part made of an acrylic resin (refractive index (nD)=1.52) was produced using each resin composition. Then, a black pattern was displayed on the image display part in the presence of an external light source (500 to 600 lux), and the brightness (brightness distribution) of the displayed black pattern was measured. The measurement of the brightness of the black pattern determines the quality of the contrast.

TABLE 1

|  | Transmittance (%) | Storage modulus (Pa) | Curing shrinkage ratio (%) | Average surface roughness (nm) | Refractive index (nD) | Brightness (cd/m$^2$) |
| --- | --- | --- | --- | --- | --- | --- |
| Example 1 | 90 or more | $1 \times 10^6$ | 4.5 | 5.5 | 1.47 | 10 or less |
| Example 2 | 90 or more | $1 \times 10^4$ | 1.8 | 2.7 | 1.52 | 10 or less |
| Example 3 | 90 or more | $4 \times 10^3$ | 1.0 | 1.5 | 1.52 | 10 or less |

TABLE 1-continued

| | Transmittance (%) | Storage modulus (Pa) | Curing shrinkage ratio (%) | Average surface roughness (nm) | Refractive index (nD) | Brightness (cd/m$^2$) |
|---|---|---|---|---|---|---|
| Example 4 | 90 or more | $4 \times 10^5$ | 3.8 | 5.0 | 1.52 | 10 or less |
| Comparative Example 1 | 90 or more | $2 \times 10^7$ | 5.6 | 12.4 | 1.49 | Uneven* |
| Comparative Example 2 | 90 or more | $3 \times 10^8$ | 4.3 | 36.5 | 1.49 | Uneven* |
| Comparative Example 3 | 90 or more | $5 \times 10^8$ | 5.6 | 64.2 | 1.50 | Uneven* |

*Uneven: measurement was difficult due to unevenness in brightness.

As is clear from Table 1, in Examples 1 to 4, the storage modulus was $4 \times 10^3$ to $1 \times 10^6$ Pa, and the curing shrinkage ratio was 1.0 to 4.5%. Therefore, the average surface roughness Ra was 1.5 to 5.5 nm, and almost no distortion occurred. The results were satisfactory. However, in Comparative Example 1 (Ra=12.4 nm), Comparative Example 2 (Ra=36.5 nm), and Comparative Example 3 (Ra=64.2 nm), Ra was large. This indicates that the interface between the resin and the glass plate was deformed due to the internal stress during curing of the resin.

Moreover, in Example 1, the refractive index of the cured resin was substantially the same as that of the acrylic plate used as the protective part, so that no light scattering occurred. Therefore, the value of the brightness was found to be good, i.e., 10 cd/m$^2$ or less.

Example 5

50 Parts by weight of polyisoprene methacrylate (trade name: UC-203, manufactured by Kuraray Co., Ltd.), 10 parts by weight of hydroxybutyl methacrylate (trade name: LIGHT-ESTER HOB, manufactured by Kyoeisha Chemical Co., Ltd.), 20 parts by weight of a low-molecular weight polybutadiene polymer (trade name: Polyoil 110, manufactured by ZEON corporation), 4 parts by weight of a photopolymerization initiator (trade name: IRGACURE 184, manufactured by Ciba Specialty Chemicals Inc.), and 1 part by weight of a photopolymerization initiator (trade name SpeedCure TPO, manufactured by Nihon SiberHegner K.K.) were kneaded using a kneader to prepare a resin composition of Example 5.

Example 6

50 Parts by weight of polyisoprene methacrylate (trade name: UC-203, manufactured by Kuraray Co., Ltd.), 20 parts by weight of hydroxybutyl methacrylate (trade name: LIGHT-ESTER HOB, manufactured by Kyoeisha Chemical Co., Ltd.), 20 parts by weight of a low-molecular weight polybutadiene polymer (trade name: Polyoil 110, manufactured by ZEON corporation), 4 parts by weight of a photopolymerization initiator (trade name: IRGACURE 184, manufactured by Ciba Specialty Chemicals Inc.), and 1 part by weight of a photopolymerization initiator (trade name SpeedCure TPO, manufactured by Nihon SiberHegner K.K.) were kneaded using a kneader to prepare a resin composition of Example 6.

Example 7

50 Parts by weight of polyisoprene methacrylate (trade name: UC-203, manufactured by Kuraray Co., Ltd.), 20 parts by weight of hydroxybutyl methacrylate (trade name: LIGHT-ESTER HOB, manufactured by Kyoeisha Chemical Co., Ltd.), 15 parts by weight of a low-molecular weight polybutadiene polymer (trade name: Polyoil 110, manufactured by ZEON corporation), 4 parts by weight of a photopolymerization initiator (trade name: IRGACURE 184, manufactured by Ciba Specialty Chemicals Inc.), and 1 part by weight of a photopolymerization initiator (trade name SpeedCure TPO, manufactured by Nihon SiberHegner K.K.) K.K.) were kneaded using a kneader to prepare a resin composition of Example 7.

Evaluation 2

The resin compositions prepared in Examples 1 and 5 to 7 were measured for light transmittance, storage modulus, curing shrinkage ratio, surface roughness, refractive index, and brightness in the same manner as in Evaluation 1. The results are shown in Table 2.

Note that, in the brightness measurement, an acrylic plate or a glass plate shown in Table 2 was used as the protective part.

| | Transmittance (%) | Storage modulus (pa) | Curing shrinkage ratio (%) | Average surface roughness (nm) | Refractive index (nD) | Retractive index (nD) of protective part material | Brightness (cd/m$^2$) |
|---|---|---|---|---|---|---|---|
| Example 5 | 90 or more | $1 \times 10^6$ or less | 4.5 or less | 5.5 or less | 1.51 | Acrylic plate 1.52 | 10 or less |
| Example 6 | 90 or more | $1 \times 10^6$ or less | 4.5 or less | 5.5 or less | 1.49 | Glass plate 1.49 | 10 or less |
| Example 7 | 99 or more | $1 \times 10^6$ or less | 4.5 or less | 5.5 or less | 1.50 | Glass plate 1.50 | 10 or less |
| Example 1 | 90 or more | $1 \times 10^6$ or less | 4.5 or less | 5.5 or less | 1.47 | Glass plate 1.49 | 10 or less |

As shown above, also in Examples 5 to 7, the values of the light transmittance, storage modulus, and curing shrinkage ratio were similar to those in Example 1, and the average surface roughness was 5.5 nm or less. Therefore, the magnitude of distortion in the glass or acrylic plate used as the protective part was small. Moreover, in Examples 1 and 5 to 7, since the refractive index of the cured resin was substantially the same as that of the acrylic or glass plate used as the protective part, practically acceptable brightness was achieved.

INDUSTRIAL APPLICABILITY

The present invention is useful as image display devices, such as liquid display devices, and the like.

The invention claimed is:

1. An image display device, comprising an image display part and a light-transmitting protective part arranged on the image display part,
wherein
the image display device further comprises a cured resin layer arranged between the image display part and the protective part;
the cured resin layer has a light transmittance in a visible region of 90% or more and a refractive index (nD) of 1.45 or more and 1.55 or less;
the cured resin layer is a cured product of a photocurable resin composition containing at least one kind of polymer selected from the group consisting of a polyisoprene methacrylate or an ester thereof, a hydrogenated terpene resin, and a butadiene polymer;
a first polarizing plate and a second polarizing plate are arranged on the surfaces of the image display part, the cured resin layer being disposed on the first polarizing plate; and
a spacer is disposed between the image display part and the light-transmitting protective part, and the spacer surrounds a periphery of the cured resin layer.

2. The image display device according to claim 1, wherein the cured resin layer has a storage modulus at 25° C. of $1.0 \times 10^7$ Pa or less.

3. The image display device according to claim 2, wherein the cured resin layer has a storage modulus at 25° C. of $1 \times 10^3$ Pa to $1 \times 10^6$ Pa.

4. The image display device according to claim 1, wherein the cured resin layer is a cured product of a resin composition having a curing shrinkage ratio of 5% or less.

5. The image display device according to claim 4, wherein the cured resin layer is a cured product of a resin composition having a curing shrinkage ratio of 4.0% or less.

6. The image display device according to claim 1, wherein the cured resin layer has a thickness of 50 to 200 µm.

7. The image display device according to claim 1, wherein the cured resin layer has a refractive index (nD) of 1.51 or more and 1.52 or less.

8. The image display device according to claim 1, wherein the cured resin layer is a cured product of a photocurable resin composition containing at least one kind of acrylate monomer selected from the group consisting of isobornyl acrylate, dicyclopentenyloxyethyl methacrylate and 2-hydroxybutyl methacrylate; and a photopolymerization initiator.

9. The image display device according to claim 1, wherein the image display part is a liquid crystal display panel.

10. The image display device according to claim 1, wherein the protective part is formed from an acrylic resin.

11. The image display device according to claim 1, wherein the protective part is formed from an optical glass.

12. A resin composition for forming a cured resin layer that is arranged between an image display part of an image display apparatus and a light-transmitting protective part, the resin composition having a curing shrinkage ratio of 5.0% or less, a cured resin formed by curing the resin composition having a transmittance in the visible region of 90% or higher and the resin composition having a refractive index (nD) of 1.45 or more and 1.55 or less and a storage modulus at 25° C. of $1.0 \times 10^7$ Pa or less,
wherein
the cured resin layer is a cured product of a photocurable resin composition containing at least one kind of polymer selected from the group consisting of a polyisoprene methacrylate or an ester thereof, a hydrogenated terpene resin, and a butadiene polymer;
a first polarizing plate and a second polarizing plate are arranged on the surfaces of the image display part, the cured resin layer being disposed on the first polarizing plate; and
a spacer is disposed between the image display part and the light-transmitting protective part, and the spacer surrounds a periphery of the cured resin layer.

13. The resin composition according to claim 12, wherein the curing shrinkage ratio is 4.0% or less.

14. The resin composition according to claim 12, wherein the storage modulus at 25° C. is $1 \times 10^3$ Pa to $1 \times 10^6$ Pa.

15. A cured resin layer arranged between an image display part of an image display apparatus and a light-transmitting protective part, the cured resin layer having a transmittance in the visible region of 90% or higher and a refractive index (nD) of 1.45 or more and 1.55 or less,
wherein
the cured resin layer is a cured product of a photocurable resin composition containing at least one kind of polymer selected from the group consisting of a polyisoprene methacrylate or an ester thereof, a hydrogenated terpene resin, and a butadiene polymer;
a first polarizing plate and a second polarizing plate are arranged on the surfaces of the image display part, the cured resin layer being disposed on the first polarizing plate; and
a spacer is disposed between the image display part and the light-transmitting protective part, and the spacer surrounds a periphery of the cured resin layer.

16. The cured resin layer according to claim 15, having a storage modulus at 25° C. of $1 \times 10^7$ Pa or less.

17. The cured resin layer according to claim 16, wherein the storage modulus at 25° C. is $1 \times 10^3$ Pa to $1 \times 10^6$ Pa.

18. The cured resin layer according to claim 15, being a cured product of a resin composition having a curing shrinkage ratio of 5% or less.

19. The cured resin layer according to claim 18, being a cured product of a resin composition having a curing shrinkage ratio of 4.0% or less.

20. The cured resin layer according to claim 15, the refractive index (nD) is 1.51 or more and 1.52 or less.

* * * * *